J. SCHIES.
BOTTLE OR JAR CLOSURE.
APPLICATION FILED APR. 18, 1912.
1,135,328.
Patented Apr. 13, 1915.
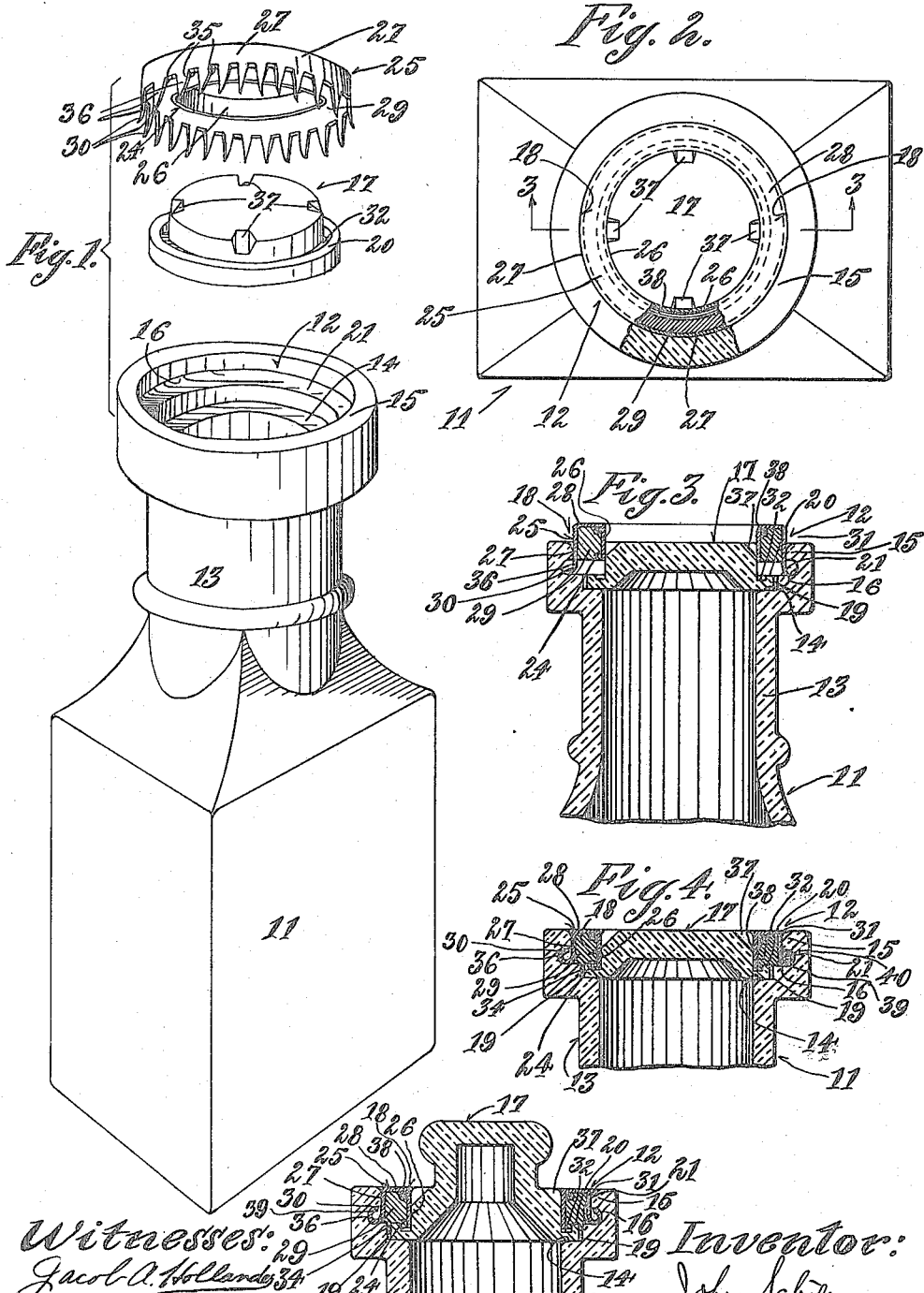

UNITED STATES PATENT OFFICE.

JOHN SCHIES, OF ANDERSON, INDIANA.

BOTTLE OR JAR CLOSURE.

1,135,328.

Specification of Letters Patent.

Patented Apr. 13, 1915.

Application filed April 18, 1912. Serial No. 691,592.

*To all whom it may concern:*

Be it known that I, JOHN SCHIES, a citizen of the United States, residing at Anderson, in the county of Madison and State of Indiana, have invented certain new and useful Improvements in Bottle or Jar Closures, of which the following is a specification.

My invention relates to bottle or jar closures, and has for its object the provision of novel means whereby the bottle or jar is closed in convenient manner and the contents protected from contact with deteriorating closing substances.

It is a further object of my invention to provide a closure of novel structure in which the parts directly exposed to contact with the contents of the bottle or jar are formed of all glass or similar material and in which the interval in the joint between the bottle or jar and its stopper is sealed with a substance not deleterious to the said contents and which is of such consistency as to be pressed into the said joint preferably at a point distanced from the interior space of the stoppered bottle or jar, my improved device being particularly available in closing bottles or jars containing prepared fruits, pickles, vegetables, or similar edibles.

The invention will be further readily understood from the following description and claims, and from the drawing, in which latter:

Figure 1 represents a perspective view of a jar and a closure therefor embodying my invention, the jar, stopper and sealing-closure being shown in spaced-apart relations. Fig. 2 is a plan view of my improved device in assembled relation. Fig. 3 is a cross-section of my improved closure taken on the line 3—3 of Fig. 2, the parts being shown in assembled but unpressed relation. Fig. 4 is a similar view showing the parts in assembled relation with the sealing-closure pressed into locking relation; and Fig. 5 is a similar view, but showing the stopper provided with a knob received through the sealing-closure.

11 represents a bottle or jar forming a container having a mouth 12 at the outer end of its neck 13. At the mouth the bottle has an inner ledge 14 and an inwardly extending lip 15, under which latter there is an outwardly extending recess 16. The ledge, lip and recess are shown annular. The bottle or jar is preferably formed of glass.

17 is a stopper, preferably also of glass, or similar material, preferably non-corrosive and having no deleterious effect on the contents of the bottle or jar. The stopper is adapted to rest on the ledge 14.

18 is a sealing groove between the stopper and the mouth of the bottle or jar, part of this sealing groove being preferably in the longitudinal projection of the mouth and part in a similar projection of the stopper, there being a joint 19 between the side of the stopper and the mouth. The bottom of the sealing groove is preferably formed partly by the shoulder 20 on the stopper and partly by the shoulder 21 on the bottle. The bottom of the recess 16 and the shoulders are preferably in coincident planes at right angles to the longitudinal axis of the bottle or jar when the stopper is seated in the mouth of the latter. The sealing groove, the joint and the shoulders are also preferably annular.

25 is a sealing-closure, shown ring-formed for being received in the sealing groove. It is formed with an inner wall 26 and an outer wall 27 connected at their tops by a web 28 and forming a channeled structure 24 in which a sealing material 29 is received, the channel opening adjacent to the joint between the mouth of the bottle or jar and the stopper when the parts are assembled for causing the sealing material to close the interval in the joint. The walls 26, 27, are preferably annular walls of different diameters having the annular sealing channel therebetween.

The bottom of the outer wall is preferably formed with a slight outward flare as shown at 30 for directing the said bottom outwardly when pressure is exerted upon said closure. The channeled structure is formed up out of a comparatively stiff material, while the sealing body 29 is preferably a flaccid material. Thus I prefer to form up the channeled structure out of a ductile metal. The sealing material may, for instance, be paraffin or wax or other sealing substance preferably not having deleterious effect upon the contents of the bottle or jar if contact between them should take place.

The inner edge 31 of the lip 15 is preferably formed rounded, so that the lower outwardly flaring end 30 of the channeled structure may be readily forced past the said lip so as to be received into the outwardly extending recess 16. The inner edge of the shoulder 20 is preferably provided with a groove 32, shown annular, into which the lower end of the inner wall of the channeled structure may be received when said sealing-closure is pressed into the sealing groove.

The sealing-closure may be assembled with its sealing material therein prior to its application to the bottle or jar. The stopper is inserted into the mouth of the container after the container has had its contents placed therein. The sealing-closure is then arranged to be inserted into the sealing groove between the mouth of the bottle or jar and the stopper, and the parts put into a suitable press for pressing the sealing-closure into said sealing groove, although this pressing may be accomplished by hand. Pressure upon the sealing-closure will spread the lower outwardly flaring end of the outer wall of the sealing-closure so as to be received under the inwardly extending lip of the mouth of the bottle or jar for locking the said sealing-closure in place. The pressure will also cause the sealing-material to be pressed into the interval of the joint 19 between the bottle or jar and the stopper, whereby a fin 34 is formed, this fin extending from said body of sealing material. The sealing material will also be pressed into the recess 16. For permitting ready bending of the said lower end of said outer wall of the sealing-closure, I prefer to form said lower end with cuts or indentations 35 for forming outwardly flaring teeth 36 at said lower end of said outer wall. The groove 32 provides clearance for the lower edge of the inner wall of said sealing-closure when the latter is pressed into place. The teeth may be curled as shown at 39 under the upper wall 40 of the recess 16, the wall of the recess being formed to guide said teeth about said wall upon axial pressure being exerted upon the closure.

As stated, the bottle or jar and the stopper are formed of glass or vitreous material, so that the contents of the package are not exposed to contact with a substance deleterious to said contents.

For permitting ready extraction of the sealing-closure, I provide recesses 37 in the wall of the sealing groove, these recesses being shown in the stopper. These recesses permit ready insertion of a sharp tool or instrument through the side wall of the sealing-closure. The tool may be fulcrumed upon the wall of the sealing groove for extracting said sealing-closure, or the sealing-closure may be extracted by outward pulling upon said tool. The material or metal of which the channeled structure or casing of said sealing-closure is formed may be a thin or weak material, and for aiding in the extraction of the same, I provide a strip 38, preferably in the form of a ring, in said sealing channel, the point of the extracting tool being arranged to be received under said strip for distributing the extracting strain thereof across a substantial portion of said casing, and thereby preventing tearing of the same.

Having thus fully described my invention, what I claim as new and desire to secure by Letters Patent, is:

1. In combination, a stopper, and an annular closure-member for a container, the said closure-member having a central space in which said stopper is releasably received and connected annular walls of different diameters about said central space forming an annular space between said walls, and a sealing means in said annular space.

2. In combination, with a container and a stopper, of a closure-member therefor having inner and outer lateral walls and a connecting web between said walls at one end thereof for forming a space between said walls, a sealing means in said space, and a reinforcing lifting ring in said space.

3. In combination, with a container of the character described provided with a mouth having an inwardly projecting lip, and a stopper, of a closure-member therefor struck up from metal with two depending annular walls of different diameters having a connecting top and forming an annular channel, a flaccid sealing means in said space, and the bottom edge of the outer one of said walls flared outwardly under said inwardly projecting lip, substantially as described.

4. In combination, with a container of the character described provided with a mouth having an inwardly projecting lip, a stopper received in said mouth, and a sealing closure therefor comprising a channeled ring-structure between said lip and stopper and a sealing means in the channel of said structure.

5. In combination, a container of the character described provided with a mouth, a stopper therefor, there being a joint between said mouth and stopper, said mouth having an outer wall and a sealing closure for said joint located between said outer wall and stopper and comprising a double walled structure having a channel between the walls thereof opening at said joint, and a flaccid sealing means in said channel and extending into said joint.

6. In combination, a container of the character described having a mouth, a stopper therefor, there being a sealing groove between said mouth and stopper, and a joint between said mouth and stopper at the bottom of said groove, one of the walls of said groove having a locking recess, and a sealing closure for said groove comprising a walled structure between said mouth and stopper opening at said joint and extending into said locking recess, and a sealing means in said structure.

7. In combination, a container of the character described having a mouth and a stopper therefor having a sealing groove, there being a joint between said mouth and stopper at said groove, and a sealing closure comprising a walled structure received in said groove and comprising a channel-opening at said joint and a sealing means therein, and a reinforcing extracting strip in said channel.

8. In combination, a container of the character described having a mouth and a stopper therefor having a sealing groove, and an interval of space between said mouth and said stopper the said stopper having a depression at the inner edge of said groove and said mouth having an outwardly extending recess at the outer edge of said groove, and a sealing closure having inner and outer depending walls forming a channel, the lower end of said outer wall flaring outwardly and received in said outwardly extending recess, and a sealing means, said sealing means located in said channel and having a portion thereof received in said interval.

9. In combination, with a glass container of the character described and a glass stopper therefor having a joint therebetween, of a sealing closure for said joint between said glass container and said stopper comprising a comparatively stiff casing having a channel therein opening adjacent to said joint and a flaccid sealing means in said channel.

10. In combination, with a glass container of the character described and a glass stopper therefor having a joint therebetween and having an annular groove at said joint, and a sealing closure comprising a flaccid sealing means closing said joint and a ring-formed inclosing structure for said sealing means having locking connection with said container.

11. In combination, a container of the character described having an annular mouth provided with a ledge, a stopper received on said ledge, said mouth and stopper having a sealing groove at the joint between said mouth and stopper, and a sealing closure in said groove comprising a double-walled structure forming a channel opening at said joint and a flaccid sealing material in said channel, and a reinforcing extracting strip in said channel, one of the walls of said groove provided with a recess for the reception of an extracting tool.

12. In combination, a container of the character described having a mouth and a stopper therefor of vitreous material having a sealing groove with a joint therein and an outward extension in said container in the wall of said groove, and a sealing means received in said groove and extension for sealing said joint and locking said stopper in said mouth.

13. In combination, a container of the character described having a mouth and a stopper therefor having a groove at the joint between said container and said stopper, the outer wall of said groove provided with an outwardly extending recess having an upper wall, and a sealing-closure therefor having outer teeth received in said recess and arranged for being curled outwardly therein against said upper wall upon axial pressure on said sealing-closure.

In testimony whereof, I have hereunto signed my name in the presence of two subscribing witnesses.

JOHN SCHIES.

Witnesses:
WEIR M. MILEY,
J. ROSS TRACY.

Copies of this patent may be obtained for five cents each, by addressing the "Commissioner of Patents, Washington, D. C."